United States Patent [19]

Sabreen

[11] Patent Number: 5,051,586

[45] Date of Patent: Sep. 24, 1991

[54] CORONA CHARGING OF PLASTIC AND APPARATUS THEREFOR

[76] Inventor: Scott R. Sabreen, 7804 Vienna Dr., Plano, Tex. 75025

[21] Appl. No.: 510,607

[22] Filed: Apr. 18, 1990

[51] Int. Cl.$^5$ ............................................. H01T 19/04
[52] U.S. Cl. .................... 250/324; 361/225; 361/229; 361/230; 361/233; 422/186.04; 422/186.05; 422/907; 204/164; 264/26; 156/272.6
[58] Field of Search ................. 250/325, 326, 324; 361/233, 230, 229, 225; 422/186.04, 186.05, 907; 204/164; 264/26; 156/272.6

[56] References Cited

U.S. PATENT DOCUMENTS

| | | | |
|---|---|---|---|
| 2,879,395 | 3/1959 | Walkup | 250/49.5 |
| 3,385,966 | 5/1968 | Rosenthal | 250/49.5 |
| 3,661,735 | 5/1972 | Drelich | 204/165 |
| 4,002,907 | 1/1977 | Kalwar | 250/325 |
| 4,153,560 | 5/1979 | Dinter et al. | 250/531 |
| 4,239,973 | 12/1980 | Kolbe et al. | 250/531 |
| 4,298,440 | 11/1981 | Hood | 204/165 |
| 4,412,960 | 11/1983 | Goldman et al. | 264/22 |
| 4,533,523 | 8/1985 | Ahlbrandt | 422/186.05 |
| 4,556,544 | 12/1985 | Ahlbrandt | 422/186.05 |
| 4,693,869 | 9/1987 | Pfaff | 422/186.04 |
| 4,772,788 | 9/1988 | Tsutsui et al. | 250/325 |
| 4,774,061 | 9/1988 | Ahlbrandt | 422/186.05 |
| 4,879,100 | 11/1989 | Tsutsui et al. | 422/186.05 |
| 4,892,271 | 1/1990 | Elford | 244/121 |

Primary Examiner—Jack I. Berman
Attorney, Agent, or Firm—Daniel Rubin

[57] ABSTRACT

A corona charging method and apparatus is disclosed for charging discrete and relatively isolated three-dimensional surfaces of various compositions having a generally exposed surface from which the three dimensional surface extends. The applied charge serves to significantly enhance the wetting and bonding properties of the respective surfaces and is conducted with a relatively concentrated corona emission from discharge electrodes connected to a high voltage source and directed toward the three dimensional surfaces overlying an air gap. The exposed and more accessible surfaces can be treated concomitantly with a field effect diffusion of corona from additional electrodes directed generally toward the exposed surfaces of the composition.

19 Claims, 3 Drawing Sheets

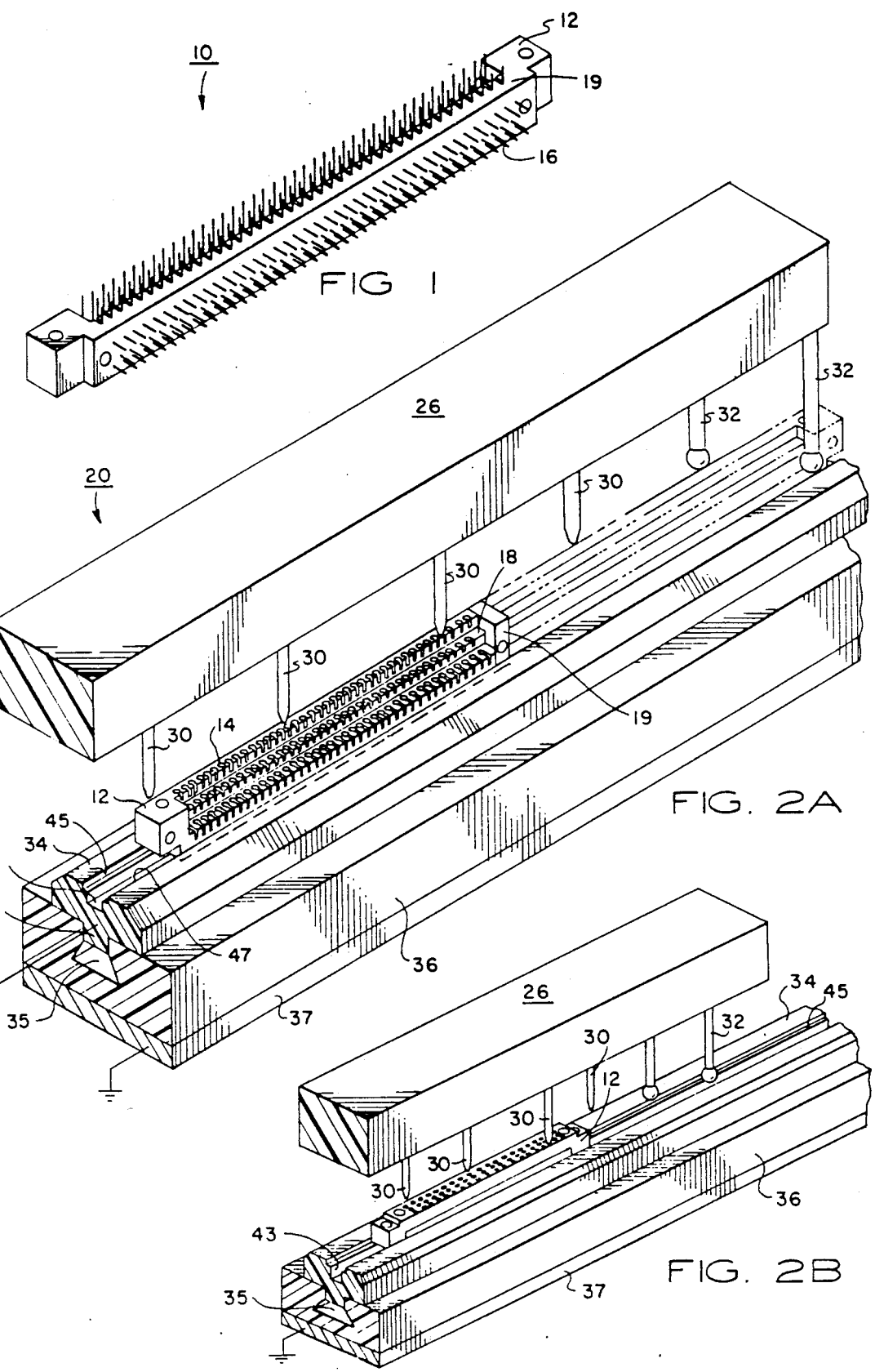

CORONA CHARGING OF PLASTIC AND APPARATUS THEREFOR

FIELD OF THE INVENTION

The field of art to which the invention relates comprises the art of applying a corona discharge treatment to the surface of articles for enhancing their surface properties of adhesion, wetting and the like.

BACKGROUND OF THE INVENTION

A preliminary application of a corona charge to articles of various metals and certain polymer plastics compositions is known to enhance wetting and bonding properties of their surface. Typically, the material or composition comprising an article has at least some dielectric properties and is in sheet, web or bulk form. For applying a corona charge, the article is fed in a controlled air gap between electrodes, one of which is energized with a high voltage electrical field and the other of which is grounded. The charge emitting electrode is typically comprised of a metal segment attached to a bar or beam.

During application, an air gap is maintained between the discharge electrode and the surface of the material on a support. The air gap typically has a lower dielectric breakdown voltage than does the material. As high voltage power is applied across the electrode, the air gap, the article and the article support, the air in the gap is believed to become ionized from acceleration of electrons to form a gaseous conductor comprising corona. The ionized air gap induces an electron avalanche which in turn creates oxidative molecules such as ozone. Oxidation of the recipient surface of the material affected by the corona increases surface energy which in turn enhances liquid wetting and adhesion promotion. While not completely understood, it is believed that the increased wetting ability is caused by small pores and crevices created by the corona in the contact area of the surface. Additionally, the easier flow tends to reduce stress concentration when the liquid solidifies.

By means of the foregoing, the corona treatment effects a surface increasingly receptive to printing inks, bonding, etc. It has been found particularly effective when used on polymeric materials, including the polyolefins, such as polypropylene, polyethylene and propylene-ethylene copolymers, and the polyesters marketed under the trademarks "Mylar", "Dacron", "Kodel", "Fortrel", etc. It is likewise effective with polyomides such as nylon, the fluorocarbons such as Teflon TM, the vinyl polymers and copolymers such as polyvinylchloride, the polyvinyl ethers, etc., the polyurethanes, the cellulosics such as cellulose acetate, cellulose ethers, etc. When applied to the named compositions, utilization of corona treatment has been found particularly advantageous in products for the medical, automotive, printing and film industries.

BACKGROUND OF THE PRIOR ART

The phenomena of corona treatment for enhancing the surface properties of various polymeric materials has received widespread use for at least two decades. Exemplifying the use of corona treatment for these purposes are the disclosures of U.S. Pat. Nos. 3,385,966; 3,661,735; 4,412,960; 4,298,440; 4,879,100; and 4,892,271.

Typically, application of the surface treatment on the various articles has been applied by a field effect principle of corona emission to relatively large and accessibly exposed surfaces of the article. In its application, field effect discharge affords a widely diffused emission of corona suitable for wide area coverage. It has been reliably effective therefore with respect to areas of relatively large surface exposure in the proximity range of its discharge path. Field effect application of corona to small and discrete three-dimensional relatively isolated surfaces has not, however, been found adequately effective in producing sufficient surface energy levels. Exemplifying the latter would be the enclosed surface of a small diameter hole open at both ends or blind at one end of less than about 5/64 inches in diameter and extending away from the exposed surface for greater than about a ⅛ inch depth. Moreover, the field effect technique has proven increasingly ineffective with increasing depth dimensions beyond about ⅛ inches as can exist with a small diameter bore extending laterally between surfaces of significant width. This inability to achieve a satisfactory charge level on the walls defining the hole surface has generally been attributed to a failure of field effect discharge to provide an adequate measure of charge penetration beyond the most immediate surface to which it is exposed.

Despite knowledge of the foregoing, it has not been known how to utilize corona treatment for advantageously treating smaller, more isolated or enclosed three-dimensional surface areas such as a small diameter hole extending angularly offset with respect to the principal surface areas.

OBJECTS OF THE INVENTION

It is therefore an object of the invention to provide novel method and apparatus effective for corona treating of discrete relatively isolated three-dimensional surface areas.

It is a further object of the invention to effect the previous object by novel method and apparatus able to adequately corona charge surfaces of elongated small diameter apertures for enhancing the wetting and bond properties of the interior wall surfaces thereof.

It is a still further object of the invention to provide novel method and apparatus for concomitantly treating with corona a plurality of article surfaces at least some of which extend removed from the outer more exposed surfaces.

SUMMARY OF THE INVENTION

The invention relates to the corona treatment of various materials including dielectric polymeric compositions for effecting surface enhanced wetting and bonding properties thereof.

More specifically, the invention in an exemplary application relates to novel method and apparatus for treating dielectric polymeric compositions containing a plurality of small diameter, closely spaced open ended holes in which metallic pins are to be disposed and adhesively bonded.

The foregoing is achieved in accordance with the exemplary utilization of the invention by treating a dielectric cartridge pre-fabricated of molded polyphenylene sulfide (PS). Such cartridges have been employed for forming an electrical connector. Preformed into the cartridges are several rectilinear spaced apart rows of open ended holes on the order of about 0.0300 to 0.0310 inches in diameter with a center to center spacing between holes of on the order of about 0.050 to 0.100 inches. Ultimately disposed adhesively bonded within and through the holes to outward of the cartridge are copper alloy contact wires typically of about 0.080 inch in diameter.

While the primary more peripherally exposed surface areas of the cartridge body can be readily corona treated with a field effect diffusion, corona charging in accordance herewith employs a focused discharge directed individually toward each hole. As a consequence, an enhanced adhesive bond is achieved between the surfaces of the hole and the wire. The end result is to significantly increase the retention force against pullout of the metal pins subsequently inserted. Unlike the substantially ineffective diffused emission produced by the field effect approach, corona charging of the holes is conducted herein at a critically controlled speed utilizing a pointed tip electrode from which a focused beam emission results. The focused beam is directed toward the hole generally parallel to its axis while the cartridge is supported with the open ended holes overlying a dielectric media. Such media can be a selected composition in conjunction with an intervening air gap of predetermined dimension.

After completing the corona treatment, the pins are inserted with adhesive into required positioning within the cartridge holes. Comparative retention force of the in-place pins has been found to be enhanced on the average by a factor of about four as compared to an untreated cartridge and almost twice the retention force produced by the conventional field effect application of corona applied generally about the holes. Moreover, with a standard of ten pounds minimum, about eleven percent of the holes treated with a field effect application were rejected for having less than about a ten-pound retention force. About twenty-seven percent were found to be at or about thirteen pounds or less. By contrast, corona treating of the holes in accordance with the invention enabled all pin wires to have a retention force considerably in excess of ten pounds.

The above noted features and advantages of the invention as well as other superior aspects thereof, will be further appreciated by those skilled in the art upon reading the detailed description which follows in conjunction with the drawings.

BRIEF DESCRIPTION OF THE DRAWINGS

FIG. 1 is an isometric view of an electrical pin connector exemplifying a product treated in accordance with the invention;

FIG. 2A is a fragmentary isometric view of a corona charging station for treating a pin connector cartridge in accordance with the invention;

FIG. 2B is a fragmentary isometric view of a corona charging station for charging another pin connector cartridge configuration;

DESCRIPTION OF THE PREFERRED EMBODIMENT

Figure 3:
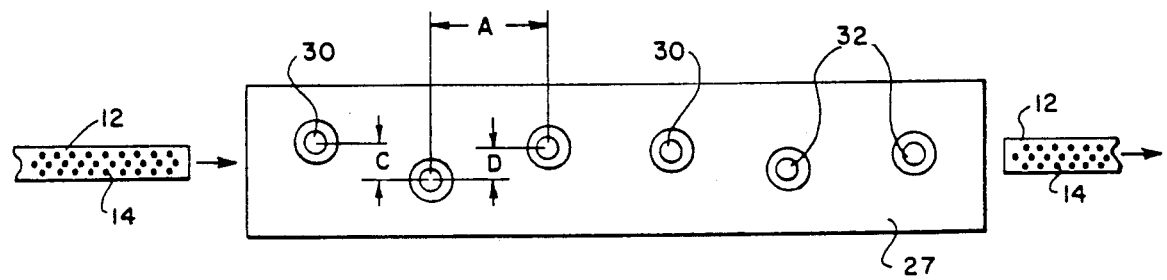
FIG. 3 is an enlarged plan view of the electrode arrangements for treating the cartridges of FIGS. 2A and 2B.
Figure 4:
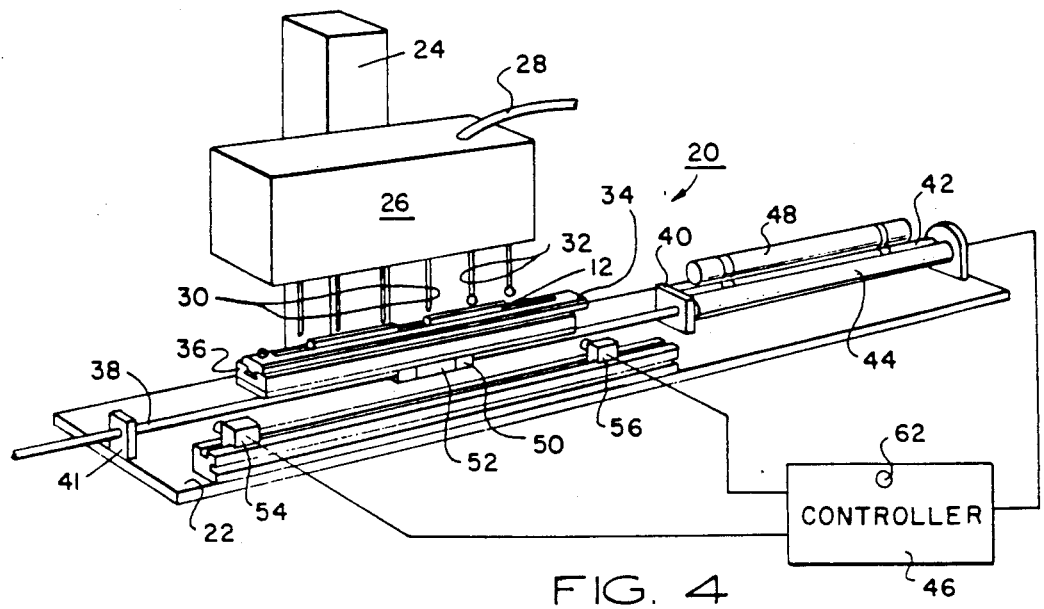
FIG. 4 is an isometric view of an operative prototype apparatus for treating the cartridges of the previous figures.
Figure 5:
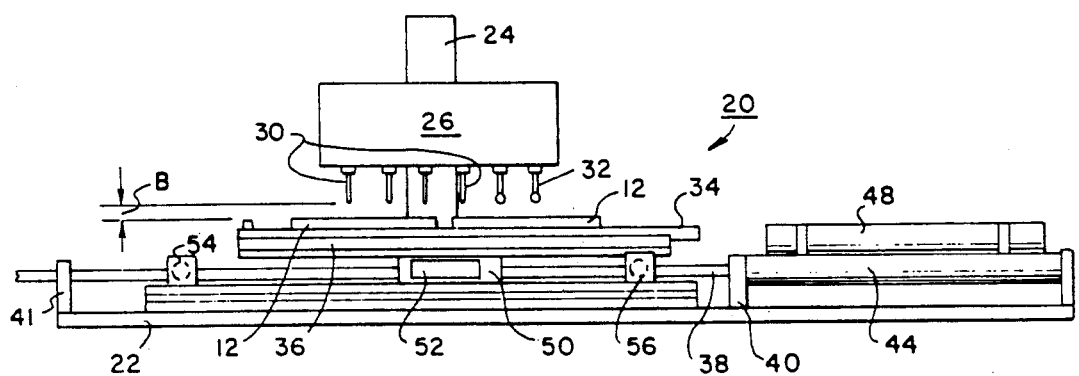
FIG. 5 is a front elevation view of the prototype apparatus of FIG. 4.
Figure 6:
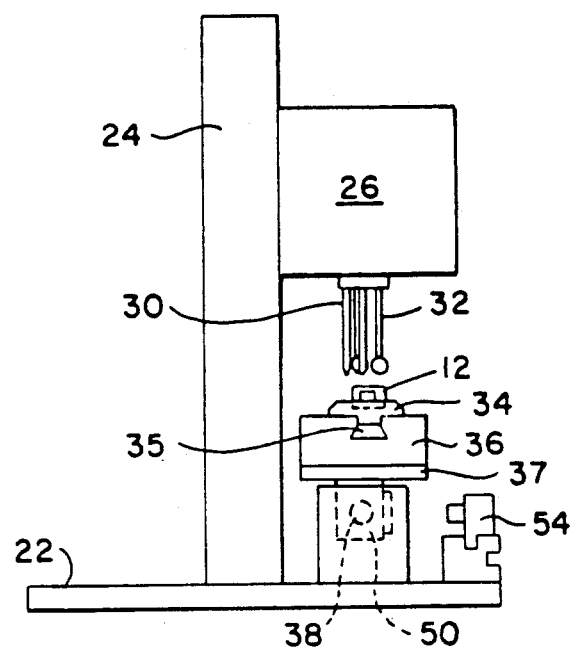
FIG. 6 is an end elevation of the prototype apparatus of FIG. 4.
Figure 7:
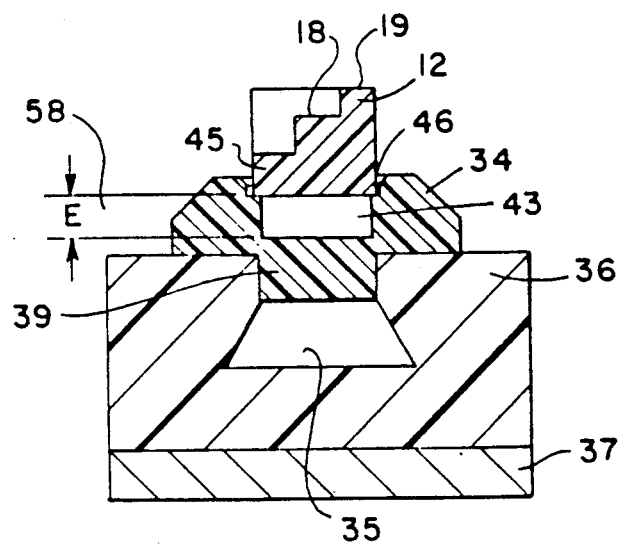
FIG. 7 is a sectional view of a cartridge support as utilized in FIG. 4.

In the description which follows, like parts are marked throughout the specification and drawings with the same reference numerals respectively. The drawing figures are not necessarily to scale and in certain views proportions may have been exaggerated for purposes of clarity.

Referring now to FIG. 1, there is illustrated an electrical connector designated 10 exemplifying the merits and advantages of the invention hereof. Comprising the connector is a cartridge 12 commonly formed of molded polyphenylene sulphide in which continuous spaced rows of right angle apertures 14 are formed for receipt of beryllium copper wire connector elements 16. PS compositions are available commercially from various sources such as marketed under the trademark "Ryton" from Phillips 66 Corporation and "Fortron" from Celanese Corporation and are characterized by suitability for relatively high temperatures and high stress applications.

As best seen in FIG. 2A, the bare cartridge 12 includes a plurality of apertures 14 extending within horizontally spaced tiered shelves 18 but otherwise surrounded by more exposed surfaces 19. The diameter of each aperture 14 for the cartridge being described is on the order of 0.0300–0.0310 inches and within each row are spaced typically 0.050–0.100 between centers. Within each hole is a well (not shown) of on the order of 0.063 inches for receipt of epoxy adhesive by which to secure the copper alloy pins 16 in position. It will be appreciated that for the sake of reliability and life expectancy the product represented by the connector 10 should maintain connector pins 16 with a high retention force against pull-out.

Under different standards depending on the market being supplied either a five pound or ten pound minimum pin retention force against wire pull-out may be required. However, due to subsequent processing in which some weakening of the bond may occur it is preferable that the initial bond following pin insertion exceed these values. At the same time, the more exposed surface portions 19 of the cartridge should be readily receptive to symbolizing of various sorts.

In FIG. 2B, the cartridge 12 lacks the tiered arrangement of FIG. 2A but is instead includes straight open-ended apertures originating in a common plane.

For applying corona treatment to the cartridge 12 in accordance herewith, reference is now made to apparatus designated 20 as illustrated in FIGS. 2-7. Comprising the apparatus is a base 22 on which the various operative components are supported. Toward one edge is an upright stand 24 supporting an electrode assembly 26 to which high voltage is supplied via a lead 28. On the underside of the assembly housing, there is provided a mounting plate 27 supporting a plurality of depending electrodes including electrodes 30 having a substantially pointed tip configuration at their distal end and electrodes 32 having a substantially bulbous configuration at their distal end.

Beneath the distal ends of the electrodes, apparatus 20 includes an elongated base 34 supported on a dielectric tray 36 having an underlying ground 37. Tray 36 includes a longitudinal partially dovetail slot 35 in which to receive a rectilinear center guide 39 on the underside of base 34. On the upper surface of base 34, there is provided a center channel slot 43 flanked by parallel shoulders 45 and 47 for supporting cartridge 12 as will be understood.

The assembly of base 34 and the dielectric tray 36 is mounted by means of a block 50 on a displaceable rail 38. The rail extends between bearing blocks 40 and 41 for controlled displacement via a hydraulic piston 42 and a pneumatic piston 44 operative in unison under control of controller 46. An oil reservoir 48 is utilized in conjunction with hydraulic piston 42. Securing the dielectric tray 36 to rail 38 is a block 50 on the underside of the tray and which carries a metal sensor plate 52. By means of the pistons 42 and 44 causing displacement of rail 38, the tray 36 along with base 34 are caused to move in a reciprocal displacement stroke beneath the electrodes 30 and 32. Proximity sensors 54 and 56 are positioned opposite the path of plate 52 and are responsive to the presence of plate 52 to emit signals to controller 46 as the tray 36 reaches the end of stroke in either direction. For purposes of the described embodiment, it is intended that corona charging will occur on one of the forward or return strokes but not on both.

For application of charge onto a cartridge 12 on base 34, electrodes 30 and 32 are secured depending from a mounting plate 27 at the underside of electrode assembly 26 in a manner providing longitudinal spacing A between electrodes of about 1½ inches. As best seen in FIG. 3 the electrodes 30 are laterally staggered by dimensions C and D in correlation with the lateral spacing of cartridge shelves 18. At the same time, the electrodes 30 are positioned with their tips terminating slightly tiered in a gap dimension B of about 0.070-0.100 inches from the corresponding shelf surfaces to be passed beneath them. Being arranged in this manner, each of the electrodes 30 will emit a focused discharge in a concentrated area of application directed toward and substantially parallel to the axis of each aperture 14.

Unlike the relatively critical energy level generated by electrodes 30, the function of electrodes 32 is to concomitantly apply corona to the more accessibly exposed peripheral surfaces 19 of the cartridge on which symbolizing is to be imposed. Consequently, placement of the bulbous electrodes 32 for emitting a field effect diffusion onto the remaining surfaces 19 of the cartridge is less critical than that of electrodes 30.

Essential to the operation hereof, is that the underside of open-ended apertures 14 be exposed during charging to a relatively weaker dielectric in the form of an open air gap 58 defined vertically between shoulders 45, 47 and the bottom of slot 43. The air gap serves to allow free air movement while preventing turbulence to aid passing of the corona through the apertures. Gap 58 has dimension E on the order of about 0.100 inches. With the components situated in the foregoing arrangement, pneumatic piston 44 supplies the power while hydraulic piston 42 provides a constant speed for traversing cartridge 12 past the electrodes whenever controller 46 is actuated by depression of operating button 62. With a voltage of about 8-66 KV and frequency of about 20-25 khz applied to the electrodes, cartridges 12 are caused to be displaced by operation of the pistons in the corona emission path of the electrodes.

In order to ensure that an adequate energy level of charge is attained on the wall surface of holes 14 sufficient for enhancing the adhesive bond of the pins to the desired extent, it has been found essential, that the rate of rail travel during the application of charge be carefully controlled. As measured prior to insertion of pins 16, advancing the tray 36 at a linear velocity on the order of about two inches per second or less produced surface energy levels in excess of 60 dynes/cm. Similarly, higher treating velocities on the order of between 3.0 to 3.5 inches per second reduced the surface energies to on the order of about 40-52 dynes/cm. In either event, it is estimated that the energy levels on the hole surfaces is about thirty percent higher. While the travel speed of the cartridge with respect to the stationary electrodes is deemed critical, it will obviously vary depending on a specific application and structure of the item being treated where other than that being described.

The following chart exemplifies retention forces in pounds for the pins 16 utilizing the focused corona treatment hereof in contrast to the previously untreated or field effect charging method previously utilized.

|  | Average P.O. Force-lbs. | Failure Rate-Percent[1] | Failure Rate Percent[2] |
| --- | --- | --- | --- |
| W.O. Corona Treatment | 6 | 75 | 95 |
| Field Effect Corona Treatment | 17 | 11 | 27 |
| Focused Corona Treatment | 26 | 0 | 0.9 |

[1] 5-10 lbs. of force
[2] 11-13 lbs. of force

It should be appreciated that the mentioned retention values are ascertained prior to completed processing of the cartridges during which some bond weakening may occur.

In operation, with one or more cartridges 12 placed on a base 34, the cartridges are capable of being displaced in the emission paths of the depending electrodes 30 and 32. Voltage is applied to the electrodes and displacement of the cartridges is caused to occur from actuation of controller 46, at a controlled velocity so as to optimize the charge applied to each individual aperture 14. A surface charge level on the order of at least 50 dynes/cm is ordinarily preferred in order to maximize the retention strength of pins 16. Following a complete traverse of the cartridges, treatment is completed and the applied charge will remain on the cartridge for greater than about three months before the charge begins to significantly dissipate. With adhesive placed in the well of each aperture, the individual pins can be inserted in a conventional manner to produce an adhesive bond of about 26 pounds on average. Since each hole receives individual treatment, the rate at which the treatment can be applied is significantly greater than has been previously possible with the prior utilized field effect charging since diffused emission of the latter required significantly slower travel to insure even a minimum of coverage.

By the above description, there is disclosed novel method and apparatus for applying corona treatment to discrete isolated areas of an article with surface energy levels previously unattainable by prior techniques. By virtue of the increased level of energy, the ability of the discrete isolated areas such as an open-ended or a blind ended hole to receive and adhesively retain an element disposed therein is substantially superior when compared to similar approaches previously utilized. At the same time, the process disclosed can be conducted more rapidly than previously possible enabling an increasingly greater production rate than previously achieved.

Whereas a prototype apparatus 20 has been described for purposes of disclosure, it should be readily apparent that a unidirectional conveyor could be utilized and substituted for achieving an even higher production volume in the treatment of such cartridges. The virtues thereof are many, not least of which is the superior product which can be produced thereby insuring greater product reliability while enjoying a decrease rather than an increase in fabrication cost. While the invention has been described principally in association with treatment of polymer type articles, it is not intended to be limited thereto since it can be appreciated that metals such as aluminum alloys and other compositions can similarly enjoy the virtues which the invention affords.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A method of corona treatment for a three dimensional first surface disposed relatively isolated within an article having a generally exposed second surface from which the depth of the first surface extends; said method comprising the steps of:
   providing a corona electrode capable when energized of emitting corona in a narrowly focused path of relatively concentrated emission;
   supporting said article with at least said first surface supported in said emission path; and
   energizing said electrode for applying a corona charge into at least said first surface.

2. A method of corona treatment in accordance with claim 1 in which the depth dimension of said first surface has a predetermined angular orientation with respect to said second surface and said electrode is arranged for its emission path to extend toward said first surface in a correlated angular orientation therewith.

3. A method of corona treatment in accordance with claim 1 in which said article supporting step includes supporting said article over an underlying area of selected dielectric properties.

4. A method of corona treatment in accordance with claim 3 in which said emitted corona is directed toward a first end of said first surface and said underlying area comprises an air gap subtending a second end of said first surface.

5. A product treated by the process of claim 1.

6. A method of corona treatment for a relatively isolated tubular first surface extending in a predetermined angular orientation between an open end and a blinded end within an article having a generally exposed second surface from which the first surface extends, said method comprising the steps of:
   providing a corona electrode arranged for its emission path to extend toward said first surface in a correlated angular orientation therewith and capable when energized of emitting corona in a path of relatively concentrated emission;
   supporting said article with at least said first surface supported in said emission path; and
   energizing said electrode for applying a corona charge onto at least said first surface;

7. A method of corona treatment for a relatively isolated first surface of an article formed of a dielectric polymeric composition having a generally exposed second surface from which the first surface extends and in which said first surface comprises at least one relatively small diameter open ended hole extending from between said second and third surface of said article, said method comprising the steps of:
   providing a corona electrode capable when energized of emitting corona in a path of relatively concentrated emission;
   supporting said article with at least said first surface supported in said emission path over an underlying area of selected dielectric properties; and
   energizing said electrode for applying a corona charge onto at least said first surface.

8. A method of corona treatment in accordance with claim 7 in which said hole is of a diameter at least less than about 5/64 inches.

9. A method of corona treatment in accordance with claim 7 in which said first surface comprises a plurality of open-ended holes of a diameter at least less than about 5/64 inches arranged in a pre-determined pattern with respect to at least said second surface of said article, and said step of applying corona includes individually applying corona into each hole of said plurality.

10. A method of corona treatment in accordance with claim 8 including the added steps of providing a second corona electrode for generating a field effect corona discharge and concomitantly operative with said concentrated emission for applying said field effect corona discharge onto at least the second of said surfaces.

11. A method of corona treatment in accordance with claim 9 in which said article is comprised of a polyphenylene sulfide composition having a plurality of said open first surface holes in which conductive wires are to be adhesively disposed and said holes are less than at least about 0.0310 inches in diameter and are spaced apart between about 0.050 to 0.100 inches on center.

12. A method of corona treatment in accordance with claim 9 in which said electrode and said article are moved relative to each other at a velocity of at least less than about 3.6 inches per second.

13. Apparatus for applying a corona treatment to an article having a discrete relatively isolated three dimensional first surface defined with a depth dimension extending away from a generally exposed second surface of said article; said apparatus comprising:
   at least one elongated first electrode supported secured at one end for connection to a high voltage source, said first electrode being operative when energized to emit a discharge of corona from about its free end in a narrowly focused relatively concentrated emission path;
   article support means supporting said article with its first surface in the discharge path of said first electrode; and
   control means for applying a high voltage source to the secured end of said first electrode to energize said electrode for a controlled time period.

14. Apparatus for applying a corona treatment in accordance with claim 13 including means to move said support means and said first electrode relative to each other at a controlled velocity during emission of said corona.

15. Apparatus for applying corona treatment according to claim 13 in which said article first surface comprises a plurality of first surfaces spaced apart in a predetermined varied pattern and said at least one first electrode comprises a plurality of first electrodes arranged in a staggered pattern generally correlated to the varied pattern of said first surfaces.

16. Apparatus for applying corona treatment in accordance with claim 13 in which said first surface is of tubular configuration an extends between openings at opposite ends, and said support means supports said article with one end of said first surface in the discharge path of said electrode and the other end adjacent an area of a relatively weaker dielectric.

17. Apparatus for applying corona treatment in accordance with claim 16 in which said area of weaker dielectric comprises an air gap.

18. Apparatus for applying corona treatment in accordance with claim 16 including at least one elongated second electrode supported secured at one end for connection to said high voltage source and operative when energized to emit a discharge of corona from about its free end in a relatively diffused emission path for operation concomitantly with said concentrated emission to apply corona to said exposed second surface.

19. Apparatus for applying corona treatment in accordance with claim 13 in which said first electrode is substantially narrowed about its free end toward a pointed configuration from which said relatively concentrated emission occurs.

* * * * *